Feb. 28, 1961    T. D. STAFFORD    2,972,968
METHOD OF INSULATING AND PROTECTING PIPE
Filed Nov. 21, 1956
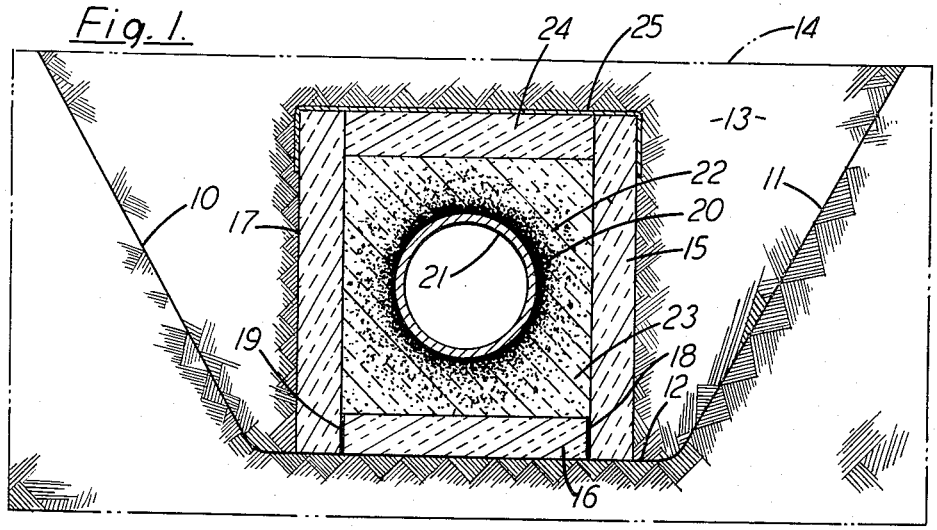
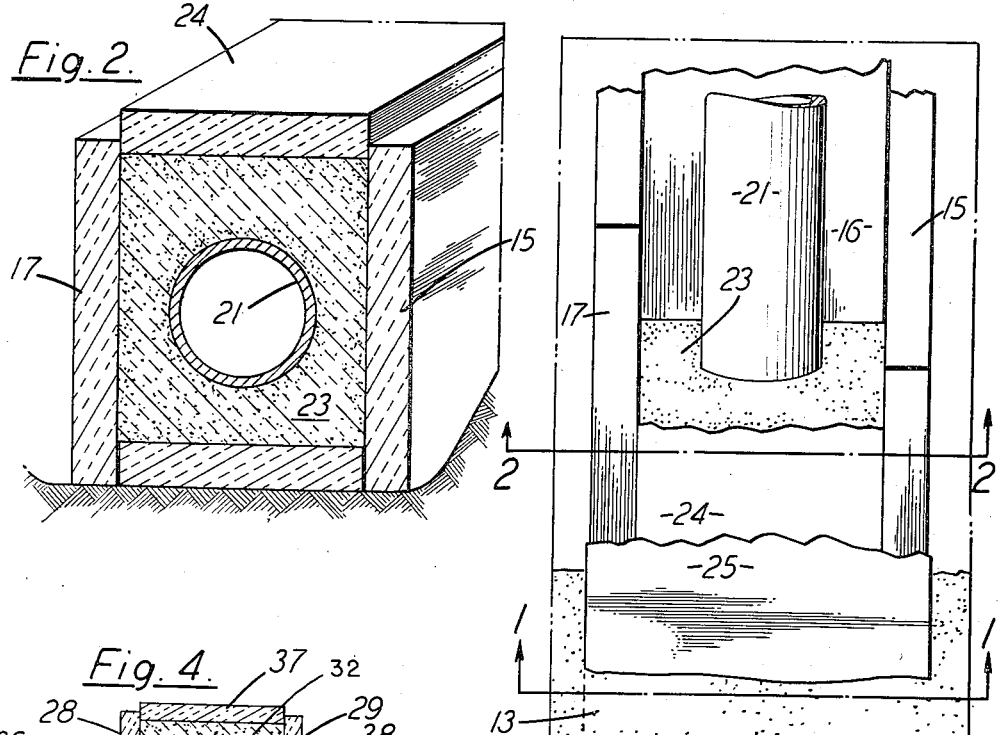
INVENTOR.
Thomas D. Stafford
-BY-
Attorney.

United States Patent Office 2,972,968
Patented Feb. 28, 1961

2,972,968

METHOD OF INSULATING AND PROTECTING PIPE

Thomas D. Stafford, 3120 Uplands Drive SE., Grand Rapids, Mich.

Filed Nov. 21, 1956, Ser. No. 623,690

4 Claims. (Cl. 111—5)

This invention relates to the insulation and protection of pipes operating at elevated temperatures, and has been developed primarily in connection with underground installations of steam and condensate lines. In general, there are two aspects to the protection of underground pipe installations: (a) the elevated temperatures increase the problems of corrosion, and (b) the functioning of insulation must remain substantially unimpaired regardless of the presence of moisture surrounding the installation. Moisture has a tendency to affect both aspects. It can reduce insulation efficiency where it is possible for it to fill the air pockets of bulk insulating material, and it can also create an alkaline or acid environment encouraging corrosion as a result of chemicals dissolved from the soil. The technique described herein provides a relatively inexpensive procedure for assuring that the pipe will be adequately protected from corrosion indefinitely, while maintaining stable insulation characteristics.

Two physically different materials are used in the practice of this invention, and certain favorable characteristics of each of these supplement the undesirable ones of the other to make a highly efficient and durable installation. The anti-corrosive protective characteristics are derived from the use of a poured granular material which congeals at elevated temperatures adjacent the pipe to form an impervious sheath. This material is preferably asphaltic in character, and is itself well-known. Used alone, however, it is of little value as an insulator because of the ease with which moisture occupies the uncongealed area having the best insulating qualities. The cost of filling a trench with this material to a level high enough to enclose the pipe is also objectionable.

This invention utilizes the protective and cushioning effects of the congealable granular material, but confines it in a covered trough having high insulating characteristics which are impervious to moisture. The trough can be carefully positioned with respect to the pipe, and the required quantity of granular material held to a minimum. Even if moisture were to find its way into the uncongealed granular material around the pipe, the presence of the impervious insulating retaining trough will still control the heat loss. This arrangement also eliminates the need for minimizing and carefully forming the trench area in order to control the quantity of poured material.

The trough, or channel, is preferably formed of panels of rigid inert material such as foam glass, and is normally placed in position around a pipe which has been installed in a trench. Any convenient means may be used for temporarily holding the trough in position until the trench is filled in. The channel assemblies can be brought up to and fitted around the pipe support units to provide a sufficient retention of the poured material to accomplish the desired results, and may be bonded to the pipe supports, if desired.

The channel is then poured substantially full of the granular material, and attention is given to filling the area completely around the pipe so that no voids remain. A cover, preferably of the same material as the channel sections, is placed between the sides of the channel on top of the poured material, and is left free to move downwardly as the poured material contracts during the conversion of the particles directly around the pipe into a solid mass. A suitable drain sheet is preferably placed on top of the assembly, followed by a filling in the remainder of the trench. If curing temperatures in excess of those usually maintained by the contents of the pipe are required, such temperatures should be generated as soon as practical after the installation.

Where corrosion problems are less critical, it is possible to fill the trough with any bulk material, which may be granular, fibrous, or powdered. The cushioning effects of this material are realized while preserving the insulation characteristics of the channel. If moisture is not excessive, the filled material will also aid in controlling heat loss.

The several features of the invention will be analyzed in further detail through a discussion of the illustrations contained in the accompanying drawing. In the drawing, Figure 1 presents a sectional elevation showing a completed installation.

Figure 2 presents a view of the condition of the assembly prior to the fusing of the granular material.

Figure 3 presents a plan view with the various layers broken away to illustrate the relationship of the various components.

Figure 4 presents a diagram showing a typical installation of a series of pipes of varying sizes, prior to the application of curing temperatures.

Referring to Figure 1, a trench having the sidewalls 10 and 11, and the bottom 12, has been filled with earth as indicated at 13 to the desired grade 14 over the pipe installation which will be discussed in detail hereinafter. After the preparation of the trench a U-shaped channel is formed in sections of suitable rigid insulating boards 15, 16, and 17, and installed in the position shown. These side and bottom boards are adhesively secured as indicated at 18 and 19 so that the channels can be handled as a unit. Adhesives suitable for this purpose are well-known.

After the positioning of the channel sections with respect to the pipe, whichever is placed in position first in the trench, the channel sections are poured substantially full of a preferably asphaltic granular material which has the characteristic of being able to form a solid congealed mass at temperatures which can be generated conveniently within the pipe. The application of such temperatures is referred to herein as "curing," and may simply be the usual temperatures of the material carried by the pipe if these temperatures approach the boiling point of water. A commercially-available material well suited for this purpose is marketed under the trademark "Gilsulate." After the application of curing temperatures, an examination of the material surrounding the pipe will reveal a fused impervious sheath directly surrounding the pipe which completely seals off the pipe from moisture or any corrosive substance. Progressing somewhat outwardly from the fully fused material is a partially fused area in which the discrete particles of the poured material retain their individuality, but tend to become bonded to each other. Progressing radially outward from this area is a mass of completely un-fused granular material which retains excellent thermal insulation characteristics. The fused and partially-fused material has a somewhat reduced thermal insulation characteristic, but maintains the ability to provide insulation under wet or dry conditions. The outer area of unfused material has the additional characteristic of providing a cushion for the support of the pipe and the fused areas. In the drawing, the fully-fused section 20 immediately surrounds the pipe 21. An intermediate area indicated at 22 may be considered as partially fused, while the outer areas indicated at 23 remain as discrete particles.

After completion of the pouring operation around the pipe, it is preferable that a cover 24 of the same material as the channel be placed in position between the sidewalls of the channel. This cover should be left free so that it can move downwardly with the poured granular material during the contraction resulting from the curing operation. A drain sheet 25 of treated paper or some other equivalent substance is preferably placed over the assembly to prevent the entrance of water into the un-fused granular material, and the fill 13 may then be placed in position.

The condition of the assembly prior to the application of curing temperatures is illustrated in Figure 2. The cover 24 is shown with its upper surface somewhat elevated above the top of the sides 15 and 17, and the granular material is in the same condition from the walls of the pipe 21 out to the retaining channel. As the curing temperature is applied, the contraction of the granular material caused by the congealing of the granular material into the solid mass around the pipe results in the lowering of the cover 24 into the position shown in Figure 1.

In Figure 4, a group installation of pipes is shown all based upon a single bottom member 26. Upright panels 27, 28, 29, and 30 establish channels which are positioned respectively to receive the pipes 31, 32, 33, 34, and 35. Figure 4 illustrates the condition of the assembly prior to the application of curing temperatures, and with the top panels 36, 37, and 38 elevated from the final position they can be expected to assume. Such an installation as shown in Figure 4 (or of the type shown in Figure 1) can be prepared on any base ground level, and may simply be covered over with fill, if desired, rather than positioning the unit in a trench.

The particular embodiments of the present invention which have been illustrated and discussed herein are for illustrative purposes only and are not to be considered as a limitation upon the scope of the appended claims. In these claims, it is my intent to claim the entire invention disclosed herein, except as I am limited by the prior art.

I claim:

1. A method of insulating and protecting underground pipes operating at elevated temperatures, comprising: digging a trench; installing a pipe in said trench; forming U-shaped channel sections of rigid insulating material and placing the same in axial alignment in said trench around said pipe with the open side of said channel sections upward; pouring granular asphaltic material consisting primarily of discrete particles having the characteristic of fusing and contracting into a solid mass at the normal operating temperatures in said pipe into said channel sections around said pipe, and remaining un-fused at temperatures substantially below said normal operating temperatures; placing a cover of rigid insulating material over the poured material and between the walls of said channel, said cover being free to move downwardly with said poured material as said poured material contracts; placing a drain shield over the top of said channel; and filling in said trench over the recited structure.

2. A method of insulating and protecting underground pipes operating at elevated temperatures, comprising: digging a trench; installing a pipe in said trench; forming U-shaped channel sections of rigid insulating material and placing the same in axial alignment in said trench with the open side of said channel sections upward; pouring granular asphaltic material consisting primarily of discrete particles having the characteristic of fusing and contracting into a solid mass at the normal operating temperatures in said pipe into said channel sections around said pipe, and remaining un-fused at temperatures substantially below said normal operating temperatures; and placing a cover of rigid insulating material over the poured material and between the walls of said channel, said cover being free to move downwardly with said poured material as said poured material contracts.

3. A method of insulating and protecting underground pipes operating at elevated temperatures, comprising: digging a trench; installing a pipe in said trench; forming a U-shaped channel of rigid insulating material in said trench with the open side of said channel upward; pouring granular asphaltic material consisting primarily of discrete particles having the characteristic of fusing and contracting into a solid mass at temperatures obtainable in said pipe after installation into said channel around said pipe, and remaining un-fused at temperatures substantially below said obtainable temperatures; and placing a cover of rigid insulating material over the poured material and between the walls of said channel, said cover being free to move downwardly with said poured material as said poured material contracts.

4. A method of insulating and protecting pipes operating at elevated temperatures, comprising: forming a U-shaped channel of rigid insulating material and placing the same around a pipe, with the open side of said channel upward; pouring granular asphaltic material consisting primarily of discrete particles having the characteristic of fusing and contracting into a solid mass at temperatures obtainable in said pipe after installation into said channel around said pipe, and remaining un-fused at temperatures substantially below said obtainable temperatures; and placing a cover of rigid material over the poured material and between the walls of said channel, said cover being free to move downwardly with said poured material as said poured material contracts.

References Cited in the file of this patent

UNITED STATES PATENTS

| Number | Name | Date |
|---|---|---|
| 771,594 | Wilhelmi | Oct. 4, 1904 |
| 2,355,966 | Goff | Aug. 15, 1944 |
| 2,390,129 | Shobert | Dec. 4, 1945 |
| 2,773,512 | Burk | Dec. 11, 1956 |
| 2,774,383 | Kidd | Dec. 18, 1956 |